Aug. 19, 1969

J. B. GUNN 3,462,219

STEP AND REPEAT DEVICES

Filed July 15, 1966

4 Sheets-Sheet 1

INVENTOR.
JOHN B. GUNN

BY John W Armbruster

ATTORNEY

United States Patent Office 3,462,219
Patented Aug. 19, 1969

3,462,219
STEP AND REPEAT DEVICES
John B. Gunn, Mount Kisco, N.Y., assignor to International Business Machines Corporation, Armonk, N.Y., a corporation of New York
Filed July 15, 1966, Ser. No. 565,437
Int. Cl. G03b 27/42
U.S. Cl. 355—53 12 Claims

ABSTRACT OF THE DISCLOSURE

A pair of positioning plates is provided with each plate surface arrayed with projections and indentations which allow the indexing of one plate relative to the other in more than a single direction. Each plate has like projections with the indentations therebetween formed to snugly accommodate the projections of the other plate.

This invention relates, in general, to step and repeat devices and, more particularly, to positioning means comprising pairs of indentured plates shaped with meshing and matching projections which nest together and mate precisely in a large number of positions, whereby it is made possible to shift one plate in more than one direction relative to the other plate and provide a large number of different indexing positions having similar degrees of spacing.

The novel design is a mechanism which enables two parts of any device to be set in a number of discrete and precisely reproducible positions with respect to one another. These positions form a regular array in a selected plane such as is needed, for example, for a step and repeat camera for the production of transistor diffusion masks. The attained positions also lie precisely in one level or plane and differ by precisely equal displacements.

In the fabrication of many small devices particularly batched processed microelectronic devices such as semiconductors or magnetic film spot arrays or integrated circuits formed in large quantities on a substrate surface, there is need for devices to step in two directions to perform repetitive treatments such as mechanical cut, solder spot, optical, thermal, X-ray, etc. operations. Exposures at a series of positions are usually required to be precisely oriented with regard to each small device and repeated orthogonally over a wide area to treat similarly a large number of similar devices. So, also, in the production of repetitive photographic and microfilm exposure or development treatments, it is desirable to have a stepping device affording a large number of positions into which a camera, mask or film, or series of films may be shifted, one relative to the other.

Heretofore, for successive positioning of step and repeat devices, there was reliance on screw feeds or pin and notch detents which were far from accurate when new and became less so as wear progressed. Now, it is proposed here to so shape cooperating compound slide members with projections having incline facets of nesting shapes so that shifted positions are more accurately attained and maintained so despite wear and use. In fact, it is contemplated that wear in use will perform a sort of lapping operation so that the device becomes of even greater perfection as time passes.

It is an object of the invention to provide an improved form of step and repeat device. Other uses contemplated including positioning, detenting, registering and scoring.

Another object of the invention is to provide a mechanically designed compound slide surface so arranged as to be easily cut or molded in shape so that two such mating surfaces, when shifted relative to each other, are detented into a large number of precisely spaced positions in more than one linear direction.

Another object of the invention is to provide a pair of step and repeat positioning plates with a series of regularly arranged truncated triangular pyramids. In one modification of the triangular pyramidal form of a projection, the triangle is of an equilateral form while in another modification, the pyramid is shaped with a triangular form which is right-angled and arranged to be susceptible to orthogonal orientation rather than the equilateral orientation of the first-mentioned modification.

Another object of the invention is the provision of step and repeat meshing plate devices having projections which are of a truncated conical or frustrum form arranged orthogonally so that they are the guiding means for shifting a mechanism in a truly orthogonal fashion. Since many of the batch processed devices appear on a substrate in an orthogonal array, it is of importance for positioning means to be suitable for registration of controls such as optical electron beam or laser beam operations to function in a whole series of orthogonal positions to register successively with each one of a large number of small circuits or devices and coincide in a precise position relative to the geometry of each small device.

A still further object of the invention is to provide a mechanism comprising two facing horizontal plates with inner indented faces brought together in interjacence. The upper face of the lower plate and lower surface of the upper plate are each formed with a large number of inclined facets forming a triangular pattern of truncated triangular pyramids permitting complementary nesting of the facet faces, such selective reticulate nesting positions determining the relative shifted positions of the plates. The facets are set in a regular periodic array so that the plates make firm contact in any of a large number of different bidirectional positions which have the same lattice size and symmetry as the array of facets. The accuracy of the positioning system depends on the accuracy of the facets which are consequently designed in such a way that a self-correcting lapping operation is possible. When such plates are clamped together firmly, or nested by gravity small errors in facet shape and location are resolved by small elastic deformations. Lapping operations may be performed by vibrating one or both plates when they are nested so that the cooperating facet faces are ground to a mirror surface finish.

Another object of the invention is to provide an improved method of forming a detenting plate comprising the steps of cutting a series of angular facet surfaces rising out of a face of said plate, and lapping said facet surfaces with either a separate master lap plate or merely by vibrating matching plates to provide smooth accurate nesting locations, especially for registration with the second similar plate cut with the same arrangements of facet surfaces.

The foregoing and other objects, features and advantages of the invention will be apparent from the following more particular description of preferred embodiments of the invention, as illustrated in the accompanying drawings.

Concisely stated, the invention comprises indentured compound slide plate surfaces so shaped with angular or conical projections as to be relatively shiftable and nesting in a large number of precisely spaced positions in several different linear directions. Although usually of precisely cut steel or other hard metal, it is contemplated that the positioning plates could be of a softer material such as plastics for some uses and molded or die cast instead of machine cut. Utility is to be found in any circumstance where relative spacing and displacement is required as in camera and film shifting, electronic substrate testing or treatment, machine tool repetitive cutting or other scoring, registering, detenting or positioning tasks.

Figures 1, 2B:
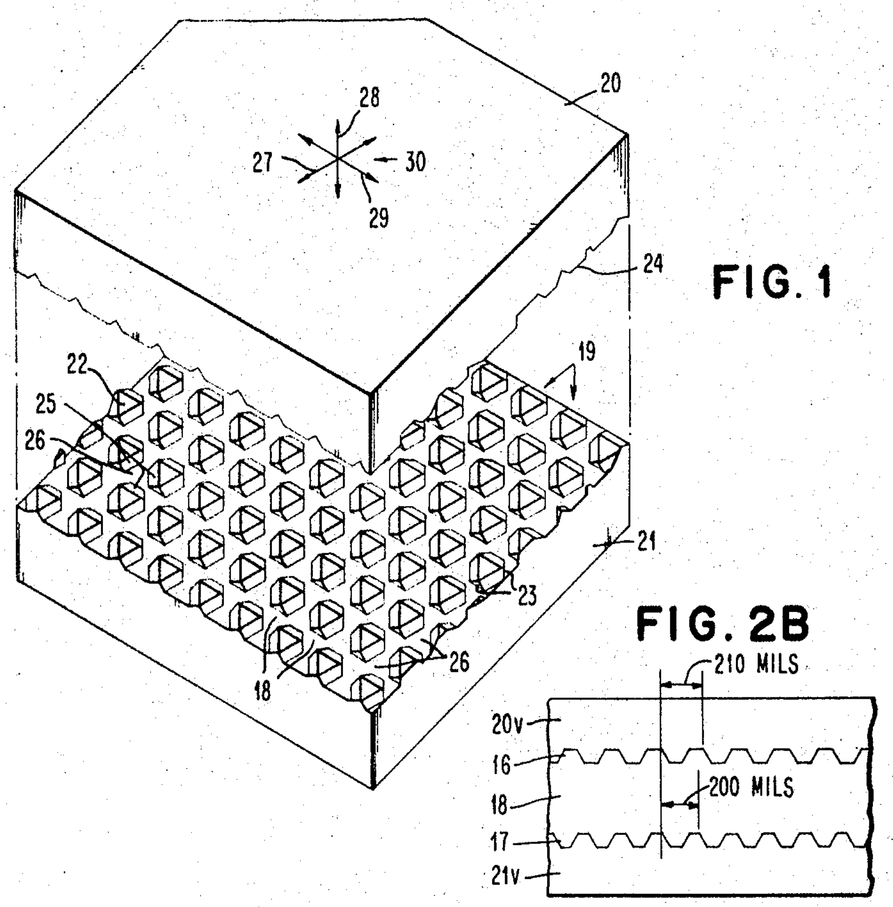
FIG. 1 is a perspective view showing a pair of separated positioning plates with the major part of the lower plate exposed to show the shapes of the triangular projections formed on the facing faces of the plates.

The mechanism consists of two horizontal plates 20 and 21, FIG. 1, normally lying in contact. The upper surface of the lower plate 21 and the lower surface of the upper plate 20 are each provided with a great number of equilateral triangular pyramids 19, truncated at 22 and having sides as lateral inclined facets 25, whose contact determines the relative positions of the plates. The pyramids 19 are set in a regular periodic array, so that the plates may make contact in any one of a large number of different shifted positions; these positions have the same lattice size and symmetry as the array of pyramids 19. The six possible directions of shift for registration are shown by the star 30. The accuracy of the system depends on the accuracy of the slanted pyramid sides or facets 25, which are consequently designed in such a way that a self-correcting lapping operation is possible.

Figure 2:
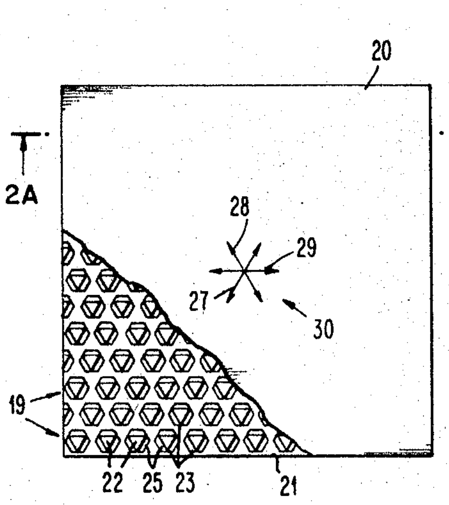
FIG. 2 is a plan view of the plates of FIG. 1 with the top face of the lower plate exposed. There is also an indication of the various directions in which the plates may be shifted to nested positions relative to each other in any one of six directions.
Figure 2A:
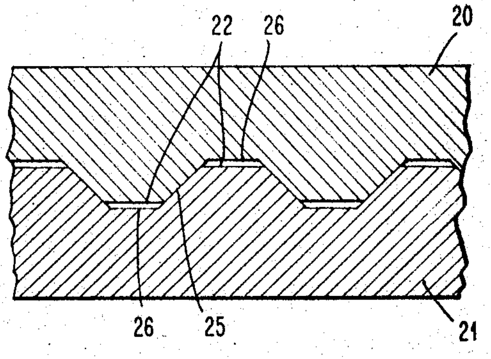
FIG. 2A is a detailed sectional view taken along line 2A—2A in FIG. 2 and through a portion of two plates brought together, showing how the slanted facets of the truncated projections match and mesh when the plates are in a selected detent position.

The preferred array proposed is also shown in the plan view, FIG. 2. The available displacements 30 lie in the plane of the paper, which is defined as the basal plane of the pyramid projection array. Identical arrays are used for both plates. Each array consists essentially of a triangular pattern of triangular pyramids, whose bases lie in the basal plane. Various parts of each pyramid as at 23 are removed to prevent interference and to permit grinding by a conventional surface grinding machine, and subsequent lapping. The angle of inclination of facets 25, FIG. 2A, is not critical, provided it is the same for all facets of one plate and complemented by the facets of a mating plate. An angle of 45° has the advantages of mutuality and suiting the plates to being shiftable with simple pushing. The areas marked 26 and 18 are roughly flat-bottomed recesses, every part of which is at least as low as the basal plane. These recesses merely provide clearance, and do not affect the locating mechanism. Consequently, their shape, awkward to machine conventionally, could be shaped by running in milling cutters at angles 27, 28 and 29 or be produced by ultrasonic impact grinding or by spark erosion. The area 26 simply represents the space between adjacent triangular pyramids, whereas that marked 18 is an area where adjacent pyramids would interfere with each other and with the lapping process described hereinafter. Each area 18 is bounded by the intersection of planes cutting off the three corners of the three adjacent triangular pyramids; the cut-off planes may be conveniently vertical. The areas marked 22 are produced by truncation of the pyramids 19, and must be slightly larger in area than the regions 26 in order to provide clearance.

When two indented surfaces such as those described are placed in contact, a number of positions can be found in which the modified pyramids on one plane fit into the pyramidal recesses between the pyramids on the other plane. Since clearance is maintained between the surfaces 22 and 26, FIG. 2A, contact will be made on the mating facets 25, which will provide a rigid constraint against translational movements. If the plates are clamped together by a reasonably large force or arranged horizontal with gravity influencing the heavy upper plate, small errors in facet location will be accommodated by elastic deformations, and the relative position will be determined by the average position of all facets 25 in contact. Errors are thus reduced. Because of the large total area of the facets in contact, the stiffness of the assembly will be very large. The kinematic nature of the contact between facets 25 (three inclined planes) ensures that any given position is highly reproducible. When the two facet arrays are firmly seated, all clearances are taken up, and loose play difficulties experienced from this cause with systems involving pins, ratchets and lead screws are eliminated.

In order to reduce the load needed to bring all facets into contact, it is necessary to reduce the errors of periodicity of the array to small values. This is not easily arrived at by precision grinding, but a lapping procedure is possible which automatically reduces such errors. For this purpose, laps are used which are similar to the extending surfaces of plates 20 or 21 except that only one set of facets is developed, everything else being cut away. This lap can then be slid back and forth in contact with the aligned facets 25 of the plate, making them exactly straight in the direction of motion of lapping. If this lapping is carried out in many different positions, errors of spacing are eliminated and the array is made exactly periodic. If two laps are used, and they are lapped together at intervals, facets lapped by them will be exactly conjugate (any curvature in the direction normal to the directions of laps 27, 28 and 29 will be equal and opposite on corresponding facets) and perfect contact will be obtained. Three laps lapped together in pairs will ensure that the facets are flat, if necessary. The only error which is not corrected by this lapping process is an error in the angles of the triangles, but this can probably be made small during the preliminary machining, eroding or grinding stage, and will, at worst, affect only the rigidity, but not the accuracy of the mechanism. Any wear which occurs in use will tend to improve the accuracy.

Another form of lapping operation may be effected by using the mating plates 20 and 21 together and shifted with a polishing slurry between them rather than employing a separate lapping element.

A vernier technique may be employed in using the detenting plates for shifting. A series of shift positions may be taken as a measure of small differences in pitch between two sets of indentations cooperating with a common central plate 18 as shown in FIG. 2B. There it is seen, by example, that the indentures 16 between center plate 18 and top outer plate 20V are cut at a 210 mil pitch while the other indentures 17 between center plate 18 and the lower outer plate 21V are cut at only 200 mil pitch. As a result it is possible to shift the plates at 10 mil intervals by vernier style adjustment (i.e., by shifting one step forward by the upper plate and one step backward by the lower plate) and produce fine step and repeat adjustments which are practically impossible with ordinary rack, pinion and detent devices. It is one of the objects of the invention to provide novel vernier step and repeat devices.

The analogy of the present indexing structure to natural maximum-density packing of lattice atomic environments may be realized by noting that the particular packing with 60° and 120° angles of projection shapes of FIG. 1 bear resemblance to the hexagonal close-packed structures of crystallography.

A characteristic of the array shown is that the array of positions is necessarily triangular. However, if certain positions are not used, a rectangular array can thus be obtained. Such a rectangular pattern might be made square by changing the angles of the triangular base of the pyramid of facets to 45°–45°–90°; and furthermore there is no particular need to use the particular equilateral shape shown in FIGS. 1 and 2 when other shapes are possible as illustrated by the right-angle projections about to be described with reference to FIGS. 3, 3A, and 3B.

Figure 3:
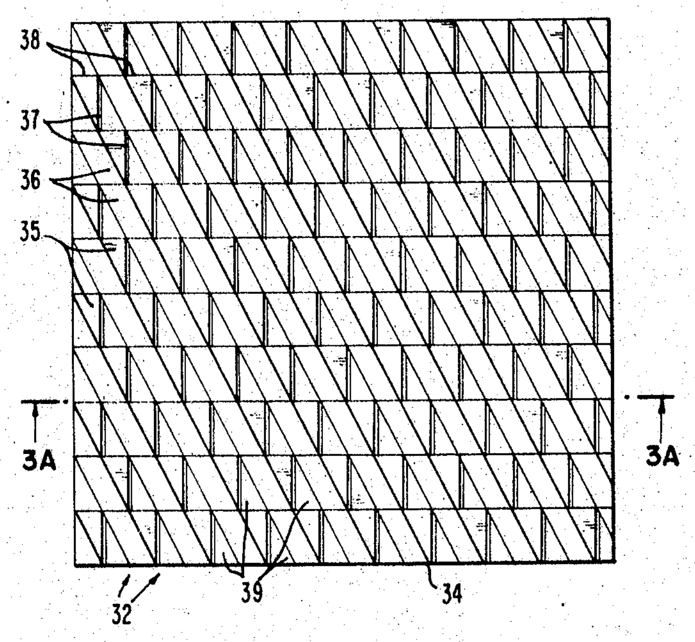
FIG. 3 is a plan view of a positioning plate with an alternative kind of triangular positioning projection which differs in being of a right-angle form rather than of the equilateral form shown in FIG. 1.
Figure 3A:
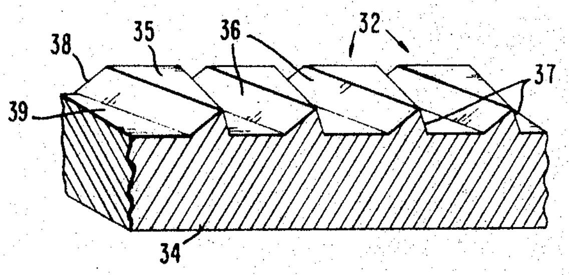
FIG. 3A is a perspective end section view taken along line 3A—3A of FIG. 3 and showing the shapes of the projections of the plate of FIG. 3 and the angle of the facets cut to form the truncated triangular right-angle projections.

As pointed out hereinbefore, although the equilateral triangular indentures of the detenting plates of FIG. 1 is a preferred form, it is apparent that other meshing projection shapes are alternatives or modifications which have their own desirable aspects. One such variety is the right-angled type of triangular truncated pyramid projection 32 formed in a regular triangular periodic array on a pair of detenting plates 33 and 34 shown in FIG. 3B as meshed in one of the nested positions. Referring to the related FIGS. 3 and 3A, showing the top face of plate 34, it is evident that each projection 32 comprises a truncate area 35, a 45° slanted facet 36, an obtuse facet 37, and a 90° rear side 38. Complementing the projections 32 of each plate is a series of periodic matching depressions subtended by floor areas 39 slightly smaller in size than the top areas 35 of the projections.

It is contemplated that sets of springs could be mounted between the index plates and operate at a direction normal to adjusting movement either to hold the plates together normally or apart and thus counteract other lifting or lowering faces used for preliminary plate adjustment used when the tooth angles are not low enough for cam slide stepping actuation of the plates.

Observation of the linear progression of floor areas 39, FIG. 3, makes it clear that the matching top plate 33 may be shifted in the plane of the paper from left to right and detented in a linear succession of detent positions of the spacing of the row period. Columnar stepping is staggered unless a jump is effected to every other meshing space, in which event, orthogonal detenting is effected between the two plates 33 and 34.

Figure 3B:
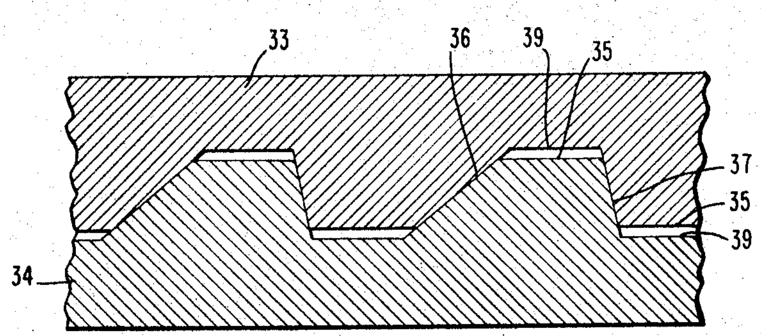
FIG. 3B is a detailed sectional elevation view showing a pair of nested indented plates brought together, such plates having projections of the form shown in FIGS. 3 and 3A with the facet angles of the projections being revealed in detail.

A mechanism comprising plates 33 and 34, FIG. 3B, finds utility in that the periodic and matching arrays of triangular projections thereon may be shifted in orthogonal and angular directions so that a multitude of precise relative positions may be assumed and be reproducible with facet contact nesting as shown in FIG. 3B. A certain amount of corrective lapping may be performed such as on the facet areas 35 and 36, but not to the degree employed with regard to the FIG. 1 modifications. Casting, molding, EDM, or ultrasonic cutting styles of shaping the metal of plates 33 and 34 are contemplated, including combinations thereof. Machining and lapping might also be in order. The same treatments apply in the case of the use of ceramics or sintered metals or softer materials such as plastics. Many of the attributes and advantages set forth with regard to the mechanism of FIG. 1, apply as well to FIG. 3 and the third modification of FIGS. 4, 4A and 4B which is to be described at this point.

Figure 4:
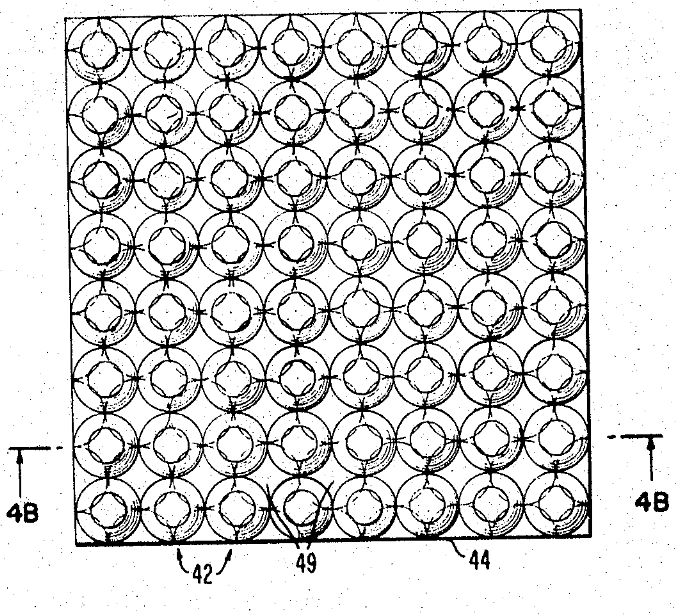
FIG. 4 is a plan view showing a third modification of a step and repeat indented plate carrying molded or cut truncated cone or frustrum projections spaced to cooperate with similarly shaped frustrums depending from an overlying plate to provide shiftable orthogonal registration of one plate with respect to the other.
Figure 4A:
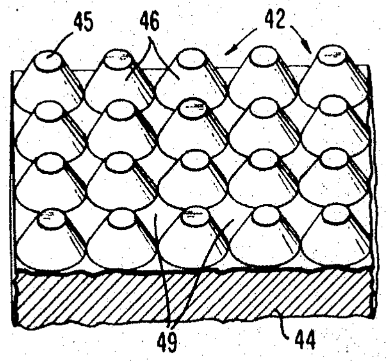
FIG. 4A is a detailed perspective view of a portion of the plate shown in FIG. 4.
Figure 4B:
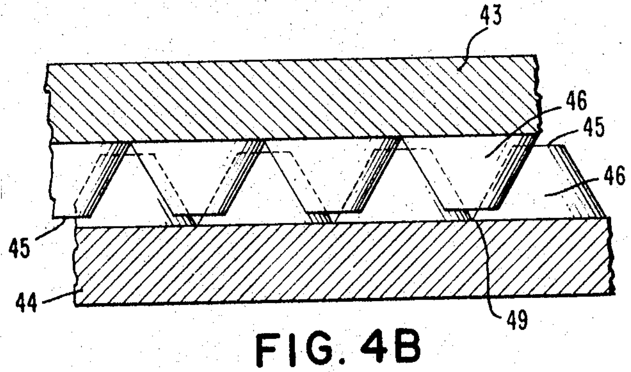
FIG. 4B is a detailed sectional elevation view showing a pair of plates arranged with the frustrum projections nesting to determine a certain orthogonal position.

The third modification of detent projection shape involves the use of a conical section such as the frustrums 42 of FIGS. 4, 4A and 4B. These truncated cones or frustrums 42 are formed and arranged in a regular orthogonal periodic array and spaced to be interchangeably nested when brought together as illustrated by the detenting plates 43 and 44 of FIG. 4B. Related FIGS. 4 and 4A show the effective face of plate 44 and there it is revealed that each projection 42 comprises a round top truncated area 45, and a slanted conical wall 46 the lower border of which touches four other borders. Between the projections 42 of each plate are the regular orthogonal periodic depressions with basal floor areas 49 which are not touched by the lowermost frustrum area 45, FIG. 4B, of a nesting upper plate 43.

The truly orthogonal arrangement of the frustrums 42 and the intermediate floor areas 49, FIG. 4, makes it obvious that a matching top plate 43 may be shifted orthogonally step by step either or both ways and find a multitude of detenting positions, one of which is illustrated in FIG. 4B. By dotted line outlines 48 in FIG. 4 of the bottom margins of superimposed frustrums in phantom, there is also illustrated the meshing or nesting characteristics of this frustrum style projection detenting device. Stepping horizontally, vertically or diagonally is possible on a unit distance basis and a whole array of square areas fully covered by nonrepetitive excursions of a positioning plate.

The alternative form of detenting plate shown in FIG. 4 has some advantages and disadvantages not found in the forms of FIGS. 1 and 3. The frustrums of FIG. 4 are easily cast, molded, sintered and eroded in metal or plastic, but are not as easily machine cut as the other two modifications. A lapping finish is not as easily applied on the conical surface but it could be performed in the style of cylindrical lapping by split brass cylinder with an interior core opening with grooves for abrasives. When used directly in a molded form for some coarse applications, it has the advantages of economical fabrication and universality of plain orthogonal positioning.

While all three forms of projections are illustrated by truncated types of shapes, it is evident that full polygonal and conical shapes are usable also.

It is quite obvious that these improved detenting devices are suitable for a wide range of utility in mechanical, optical, electronic, photochemical and other fields and it is thought that two examples of use are sufficient to establish such utility.

Figure 5:
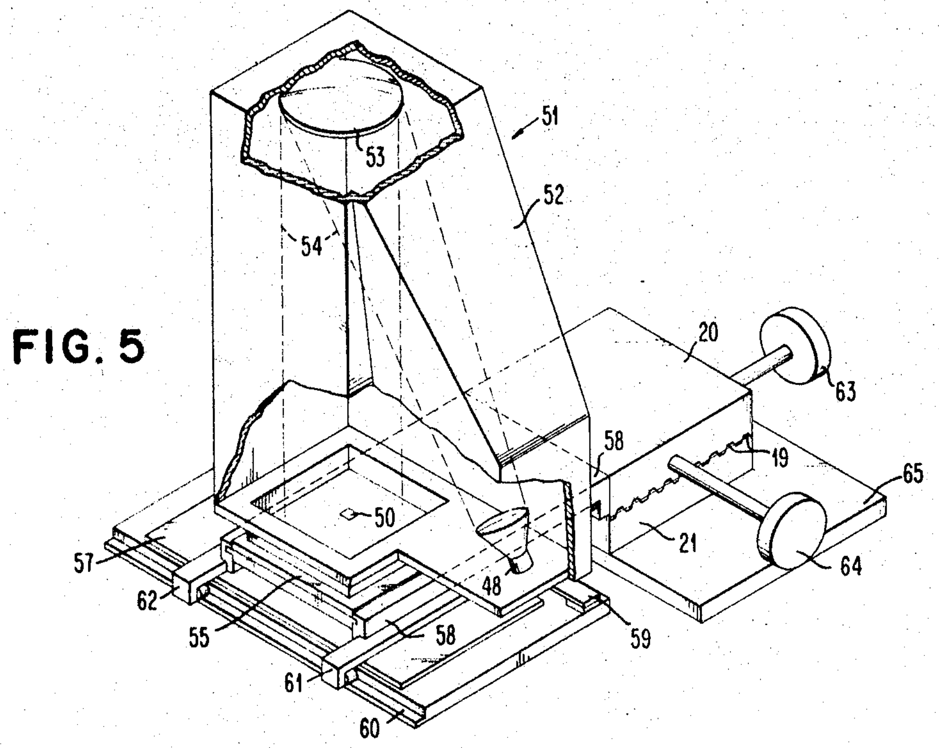
FIG. 5 is a perspective view showing a step and repeat contact printer having an adjustable compound slide comprising indented plates such as those of the present invention.

In FIG. 5, a step and repeat contact printer 51 permits the contact printing of fine line and minute separate printed circuit patterns 50 or joined patterns to close tolerances. It reproduces line thicknesses of 0.005 inch and finer and microcircuits of complicated conductor and device patterns. Line-to-line mismatch can be held to 0.0005 inch, not accumulative, over the length of the line. The bow in a joined pattern is 0.001 inch maximum over the full length of the line. Rather than long repetitive patterns, it is contemplated that the main use is for small discrete repeated microcircuits to be batch etched after exposure.

At the lower right, light source 48 contained in housing 52 directs a beam of light onto mirror 53. This is an off-axis section of a parabolic mirror with a surface accuracy of one-tenth wavelength and a ten inch diameter. Reflected parallel rays of light 54 are directed by mirror 53 through a master plate 55 having a pattern 50 to be printed on a substrate 57. The latter has a photosensitive resist emulsion on its upper surface.

Plate 55 is mounted in a chase 58 which is part of a compound slide including guide rails 61, 62 and guide channels 59, 60. Attached to chase 58 for step and repeat adjustment is any one of the described detenting means of the present invention such as the pair of plates 20 and 21, as illustrated. The rear edge of chase 58 is attached to the front end of the top detent plate 20 and this is shifted by hand knobs 63 and 64 into the desired precise orthogonal positions between the operations of lowering the chase to bring the master into firm contact with the substrate and flashing the light source 48. Plates 20, 21 are selected to have spaced projections 19 suited for the particular microcircuit spacing 50. Lower plate 21 is fastened to the base 65 tied to the whole optical device. Repetitive exposure arrays may be multiplied by shifting substrate 57 after a whole orthogonal treatment for a series of such step and repeat operations.

Better results are obtainable by making detent plate 20 itself serve as the chase 58 and be the direct holder of the master plate 55. In such a more compact device the lower detent plate 21 is directly under the chase. The FIG. 5 showing is merely illustrative and expanded for ease of illustration.

Figure 6:
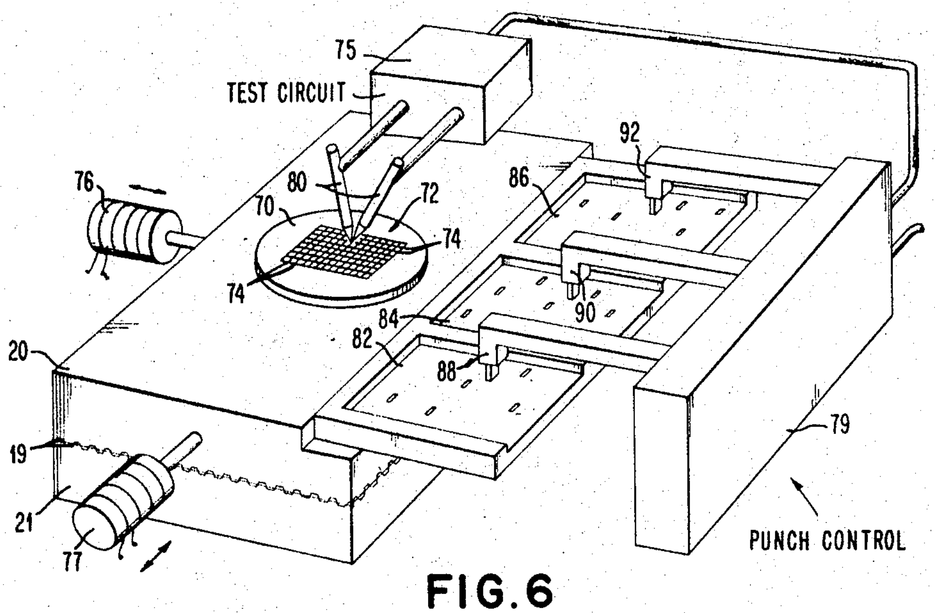
FIG. 6 is a perspective view showing a semiconductor chip tester and sorter wherein the chip shifting table is one of a pair of step and repeat positioning plates of the kind provided by the present invention.

Another example of use of the step and repeat detenting devices is in connection with probing and testing electronic devices. One such test device is shown in FIG. 6 and its use is for testing semiconductor chips and registering the results of the tests on punched cards. Subsequently, the card holes are used to sort the chips in accordance with the results of the individual tests.

Affixed to glass disk 70, by glue or otherwise, is a semiconductor wafer 72 which has been diced into a multiplicity of chips 74. Disk 70 and a multiple punched card supporting frame 78 are mounted on the shiftable top detenting plate 20 which is formed in with the teeth or pyramids 19 nested in similar projections on the fixed lower plate 21. The array of detent projections 19 is of period spacing to conform with the arrangement of the chips 74 on wafer 72. A pair of compound adjusting solenoids 76 and 77 are arranged to shift plate 20 singly or together both laterally and longitudinally to precise points so that any specific chip 74 can be brought directly beneath test probes 80 for testing purposes. As each chip is individually positioned beneath probe 80, card holder 78 and the cards 82, 84 and 86 it holds are also moved beneath punch heads 88, 90 and 92, respectively.

As a chip 74 is tested to measure its characteristics, one of cards 82, 84 or 86 is punched by a device 79 at a detented location which corresponds to the location of the particular chip under test. For instance, if the chip under test passes all tests, card 82 is punched at the detented position corresponding to the tested chip. Cards 84 and 86 are not punched. If on the other hand, the chip under test passes some measurements but is marginal on others, card 84 can be the one punched. Finally, if the chip fails the test altogether, card 86 is punched.

At the end of the testing operation, disk 70 is removed from plate 20 and chips 74 are transferred to a chip holder with bins in locations corresponding to the ones they occupied on disk 70. This operation can be accomplished by applying a solvent to the glue holding the chips while disk 70 is held in an inverted position over the bin openings.

To sort the chips, one of the punched cards, e.g., 82, is laid over chip holder bins so that each punched hole, indicating a satisfactory test, is aligned with the corresponding chip whose test result it indicates. A vacuum head is then placed over card 82 and the specific chips are drawn through the punches into the vacuum head and subsequently to a sorting pocket. By substituting punched cards 84 and 86 for card 82, all of the tested chips can be sorted and classified as bad, good and perfect in accordance with the punches.

Utility of the detenting devices is revealed by the examples of optical and eletcronic testing given with respect to FIGS. 5 and 6 which are not to be construed in a limiting sense, but rather as merely illustrative of a wide range of positioning controls for devices in general.

Although illustrated with triangular and conical section projections, it is realized that square, rectangular and other polygonal forms of projections may be employed within the scope of the present disclosure. The particular equilateral and right-angled triangular showings are not exclusive for it is evident isosceles, scalene and other acute-angled or obtuse-angled forms are possible to be cut or molded for desired results.

While the invention has been particularly shown and described with reference to preferred embodiments thereof, it will be understood by those skilled in the art that various changes in form and details may be made therein without departing from the spirit and scope of the invention.

What is claimed is:

1. An indexing device having freedom of movement in equal increments in each of a plurality of directions to provide two-dimensional positioning including, a pair of indexing plates with each plate containing a systematic array of repeating projections in a two-dimensional regular lattice-like formation with corresponding points on each projection in each of said plurality of directions having equal spacing, the relationship of the common spacing of said projections being such as to provide indented regions which snugly accommodate projections from the other plate, in a conjugate arrangement.

2. An indexing device of the kind set forth in claim 1 wherein each of said projections is a polyhedron.

3. An indexing device of the kind set forth in claim 1 wherein each of said projections is a cone.

4. An indexing device of the kind set forth in claim 1 wherein each of said projections is a pyramid.

5. An indexing device of the kind set forth in claim 1 wherein each of said projections is a truncated equilateral triangular pyramid.

6. An indexing device of the kind set forth in claim 1 wherein each of said projections is a truncated right-angle triangular pyramid.

7. An indexing device of the kind set forth in claim 1 wherein each of said projections is a frustrum of a cone.

8. An indexing device as claimed in claim 1 wherein said increments are of the same value in all of said directions.

9. An electronic test probe means comprising a test probe device, a substrate bearing an array of electronic devices to be tested, a positioning device for locating said substrate and said probe device relative to each other in a series of positions corresponding to said array, said positioning device comprising a pair of indented members brought together with indentures meshing but shiftable into said array position directions and registered in any array position to test any selected device as determined by the nesting of said indentures, and means for shifting said members and connected probe device and substrate relative to each other.

10. A vernier positioning device comprising a common central indented plate having indentations of different pitch on its two faces, a first cooperating outer shiftable plate having indentations similar to those of one face of said central plate and adapted to be brought together with said indentations in interjacence and shifted and registered in any of a plurality of positions as determined by the nesting of said indentations, and a second cooperating outer shiftable plate having different pitch indentations similar to those of the other face of said central plate and adapted to be brought together with said indentations in interjacence and shifted and registered in any of a plurality of positions as determined by the nesting of said indentations, whereby relative vernier adjustments may be made by shifting the three plates and gaining smaller intervals of desired spacing than the whole pitch of either outer plate and of intervals of spacing gauged by the difference in pitch of said indentations.

11. An indexing device for two-dimensional positioning including a pair of indexing plates, each plate having a pattern in relief comprising a regular lattice-like array of projection elements arranged so that when positioned to nest with elements of the opposite plate each of said elements of each of said plates makes contact at least at one point on each of at least three elements of the opposite plate

12. A step and repeat optical device comprising an image projecting means, an image receiving means and a two-dimensional positioning means for aligning the image of said projecting means with predefined positions on said receiving means, said positioning means comprising a pair of indexing plates with each plate containing a systematic array of projections formed in a regular lattice-like formation, each projection being of a specfic and repeating geometric shape and said projections being arranged so that the spacing therebetween firmly nests projections from the opposite plate, and means for shifting one of said pair of indexing plates with respect to the other to thereby align the image of said projecting means with one of said predefined positions on said receiving means.

References Cited

FOREIGN PATENTS 507,264 9/1930 Germany.

NORTON ANSHER, Primary Examiner

RICHARD A. WINTERCORN, Assistant Examiner

U.S. Cl. X.R.

355—86, 95; 269—63, 207